US012646401B2

(12) United States Patent
Kallenberger et al.

(10) Patent No.: US 12,646,401 B2
(45) Date of Patent: Jun. 2, 2026

(54) VIDEO ANALYTICS VALIDATION SYSTEM UTILIZING BUILDING AUTOMATION SYSTEM SENSOR DATA

(71) Applicant: Tyco Fire & Security GmbH, Neuhausen am Rheinfall (CH)

(72) Inventors: Max David Kallenberger, Franklin, WI (US); Mia Rodriguez, Germantown, WI (US); Stevan Grahovac, Waukesha, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 68 days.

(21) Appl. No.: 18/902,661

(22) Filed: Sep. 30, 2024

(65) Prior Publication Data

US 2026/0094516 A1     Apr. 2, 2026

(51) Int. Cl.
| | |
|---|---|
| *G08B 25/00* | (2006.01) |
| *G06V 10/776* | (2022.01) |
| *G06V 20/40* | (2022.01) |
| *G06V 20/52* | (2022.01) |
| *G08B 13/196* | (2006.01) |

(52) U.S. Cl.
CPC ......... *G08B 25/008* (2013.01); *G06V 10/776* (2022.01); *G06V 20/40* (2022.01); *G06V 20/52* (2022.01); *G08B 13/19634* (2013.01)

(58) Field of Classification Search
CPC ............ G08B 25/008; G08B 13/19634; G06V 10/776; G06V 20/40; G06V 20/52
See application file for complete search history.

(56) References Cited

U.S. PATENT DOCUMENTS

2014/0327555 A1* 11/2014 Sager ............... G08B 13/19682
                                                    340/870.16
2023/0070772 A1*  3/2023 Bingham ............. G08B 19/005
2024/0331071 A1  10/2024 Ouellette et al.

* cited by examiner

*Primary Examiner* — Omeed Alizada
(74) *Attorney, Agent, or Firm* — Foley & Lardner LLP

(57) ABSTRACT

Security threats are detected by a video analytics system and validated using data from a building automation system. The potential for false alarms is reduced by validating the threat using building automation system data including $CO_2$ sensors, occupancy sensors, vibration sensors, accelerometers, microphones, light sensors, contact switches, etc. Validated threats may be mitigated by initiating a responsive action within the security system and/or the building automation system. Based on the type of threat the conditions measured by the building automation system is predicted and compared to the actual conditions. The threat is validated if the comparison leads to greater confidence in the threat or the risk is great enough to justify initiating a responsive action.

20 Claims, 8 Drawing Sheets

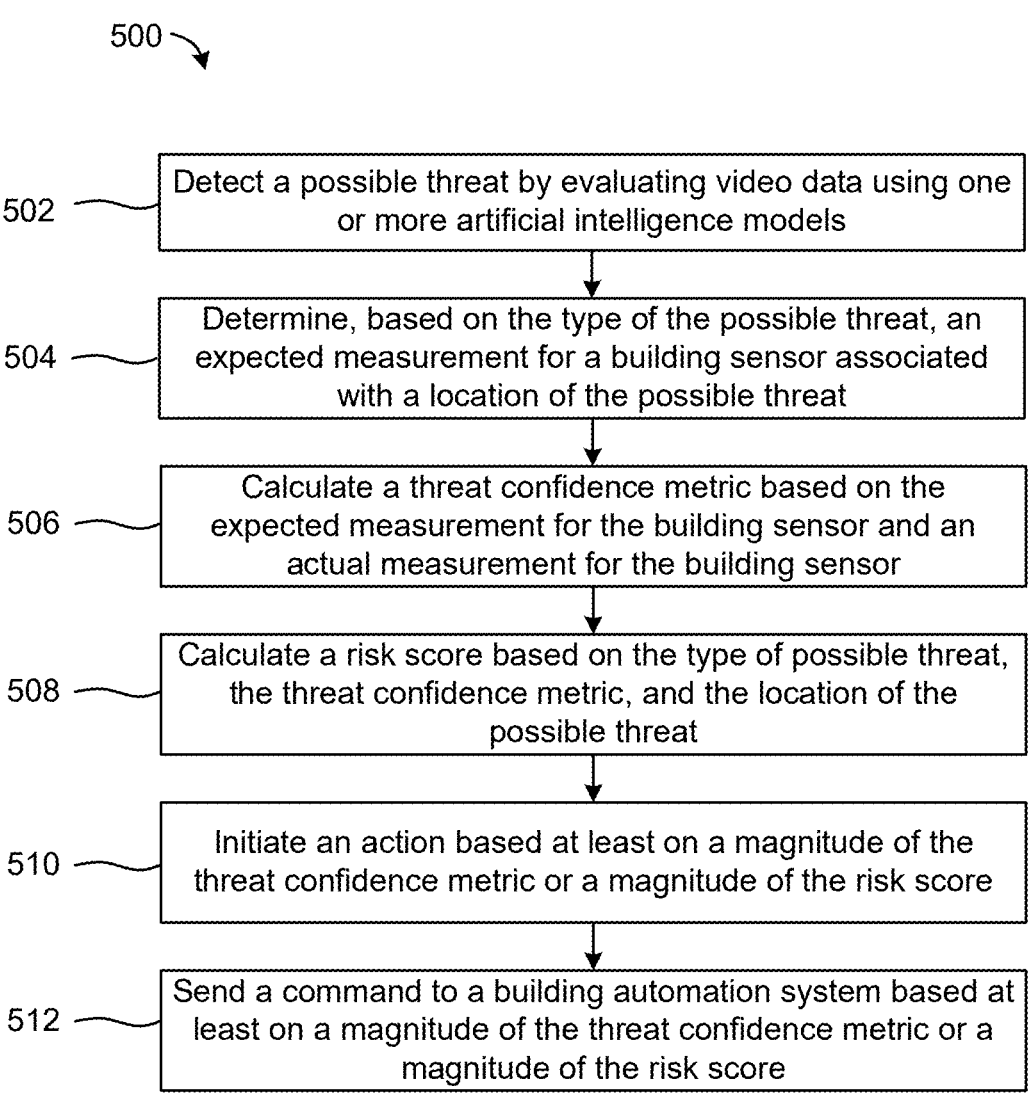

500

502 — Detect a possible threat by evaluating video data using one or more artificial intelligence models 504 — Determine, based on the type of the possible threat, an expected measurement for a building sensor associated with a location of the possible threat 506 — Calculate a threat confidence metric based on the expected measurement for the building sensor and an actual measurement for the building sensor 508 — Calculate a risk score based on the type of possible threat, the threat confidence metric, and the location of the possible threat 510 — Initiate an action based at least on a magnitude of the threat confidence metric or a magnitude of the risk score 512 — Send a command to a building automation system based at least on a magnitude of the threat confidence metric or a magnitude of the risk score

FIG. 7

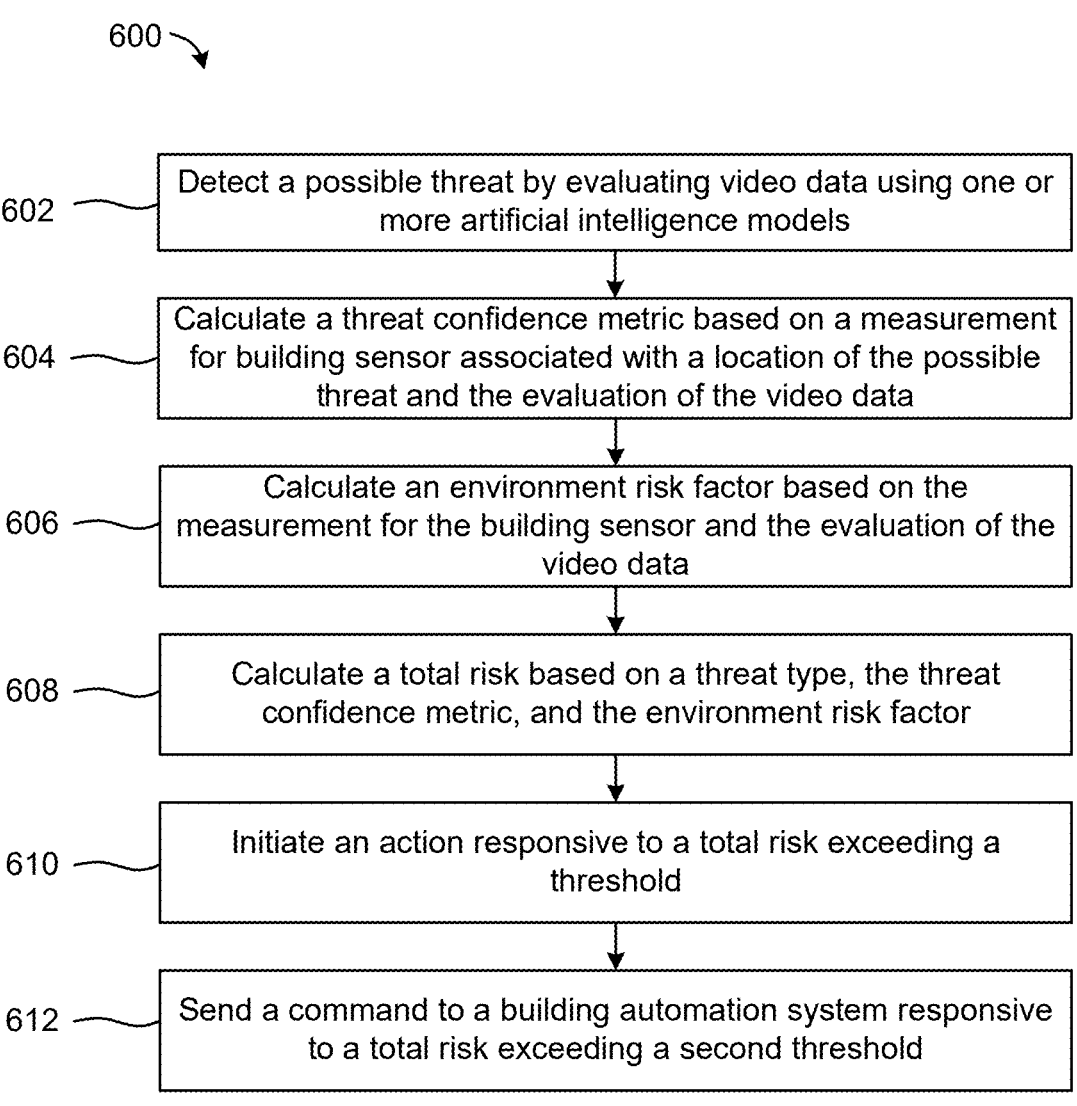

600

602 — Detect a possible threat by evaluating video data using one or more artificial intelligence models 604 — Calculate a threat confidence metric based on a measurement for building sensor associated with a location of the possible threat and the evaluation of the video data 606 — Calculate an environment risk factor based on the measurement for the building sensor and the evaluation of the video data 608 — Calculate a total risk based on a threat type, the threat confidence metric, and the environment risk factor 610 — Initiate an action responsive to a total risk exceeding a threshold 612 — Send a command to a building automation system responsive to a total risk exceeding a second threshold

FIG. 8

VIDEO ANALYTICS VALIDATION SYSTEM UTILIZING BUILDING AUTOMATION SYSTEM SENSOR DATA

BACKGROUND

The present disclosure relates generally to security systems. According to some embodiments, present disclosure relates more particularly to security systems configured to validate threats using building automation system data and, optionally, initiate a mitigating action responsive to a validated threat.

SUMMARY

At least one embodiment of the present application relates to a video monitoring system for detecting and validating security threats. The video monitoring system includes one or more memory devices having instructions stored thereon that, when executed by one or more processors, cause the one or more processors to perform operations. The operations include detecting a possible threat by evaluating video data using one or more artificial intelligence models. The operations also include determining, based on a type of the possible threat, an expected measurement for a building sensor associated with a location of the possible threat. The operations also include calculating a threat confidence metric based on the expected measurement for the building sensor and an actual measurement for the building sensor. The operations also include initiating an action based at least in part on a magnitude of the threat confidence metric.

In some embodiments, the operations also include sending a command to a building automation system to mitigate the possible threat dependent on the magnitude of the threat confidence metric.

In some embodiments, building sensor includes at least one of a microphone, a pressure sensor, a vibration sensor, an accelerometer, an occupancy sensor, a contact switch, a $CO_2$ sensor, or a light sensor.

In some embodiments, the operations also include calculating a risk score based on the type of the possible threat, the threat confidence metric, and the location of the possible threat. And initiating the action is based at least in part on the magnitude of the risk score.

In some embodiments, calculating the risk score is further based on environmental information determined by the one or more artificial intelligence models.

In some embodiments, calculating the threat confidence metric includes evaluating the one or more artificial intelligence models using the expected measurement for the building sensor and the actual measurement for the building sensor.

In some embodiments, the video data is stored to train the one or more artificial intelligence models in response to the threat confidence metric being less than a threshold.

In some embodiments, the expected measurement includes a sum of a representative measurement for the building sensor and an expected change based on the type of the possible threat.

In some embodiments, the operations also include calculating the representative measurement for the building sensor based on historical measurements of the building sensor from time periods satisfying a similarity criterion to a time of the possible threat or measurements of the building sensor from a time period preceding the time of the possible threat.

At least one embodiment of the present application relates to a method for detecting and validating security threats. The method includes detecting a possible threat by evaluating video data using one or more artificial intelligence models. The method also includes determining, based on a type of the possible threat, an expected measurement for a building sensor associated with a location of the possible threat. The method also includes calculating a threat confidence metric based on the expected measurement for the building sensor and an actual measurement for the building sensor. The method also includes initiating an action based at least in part on a magnitude of the threat confidence metric.

In some embodiments, the method also includes sending a command to a building automation system to mitigate the possible threat based at least in part on the magnitude of the threat confidence metric.

In some embodiments, the building sensor includes at least one of, a microphone, a pressure sensor, a vibration sensor, an accelerometer, an occupancy sensor, a contact switch, a $CO_2$ sensor, or a light sensor.

In some embodiments, the method also includes calculating a risk score based on the type of the possible threat, the threat confidence metric, and the location of the possible. The alert is dependent on the magnitude of the risk score.

In some embodiments, calculating the risk score is further based on environmental information determined by the one or more artificial intelligence models.

In some embodiments, calculating the threat confidence metric includes evaluating the one or more artificial intelligence models using on the expected measurement for the building sensor and the actual measurement for the building sensor.

In some embodiments, the video data is stored to train the one or more artificial intelligence models in response to the threat confidence metric being less than a threshold.

In some embodiments, the expected measurement includes a sum of a representative measurement for the building sensor and an expected change based on the type of the possible threat.

In some embodiments, the method also includes calculating the representative measurement for the building sensor based on historical measurements of the building sensor from time periods satisfying a similarity criterion to a time of the possible threat or measurements of the building sensor from a time period shortly preceding the time of the possible threat.

At least one embodiment of the present application relates to a video monitoring system for detecting and validating security threats. The video monitoring system includes one or more memory devices having instructions stored thereon that, when executed by one or more processors, cause the one or more processors to perform operations. The operations include detecting a possible threat by evaluating video data using one or more artificial intelligence models. The operations also include calculating a threat confidence metric based on a measurement for building sensor associated with a location of the possible threat and the evaluation of the video data. The operations also include calculating an environment risk factor based on the measurement for the building sensor and the evaluation of the video data. The operations also include calculating a total risk based on a threat type, the threat confidence metric, and the environment risk factor. The operations also include initiating an action responsive to the total risk exceeding a threshold.

In some embodiments, evaluating the video data includes outputting a threat uncertainty, and calculating the threat confidence metric uses the threat uncertainty.

This summary is illustrative only and should not be regarded as limiting.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is a flow of operations validating a threat using building automation system data and initiating a responsive action.

FIG. 8 is another flow of operations validating a threat using building automation system data and initiating a responsive action.

DETAILED DESCRIPTION

Overview

Referring generally to the FIGURES, various systems for and methods of validating threats from a video analytics system using building automation data are shown. Threats may be detected by a video analytics system, for example, as part of a security system. The potential for false alarms may be reduced by validating the threat using building automation system data including carbon dioxide ($CO_2$) sensors, occupancy sensors, vibration sensors, accelerometers, microphones, light sensors, contact switches, pressure sensors, etc. Validated threats may be mitigated by initiating a responsive action within the security system and/or the building automation system. Based on the type of threat the conditions measured by the building automation system may be predicted and compared to the actual conditions. The threat may be validated if the comparison leads to greater confidence in the threat or the risk is great enough to justify initiating a responsive action.

Multimodal threat detection and/or validation can have several advantages over cameras and machine vision-based systems. Cameras require line-of-sight to make a determination of a threat inside a building. The addition of disparate sensor technologies enriches the data available to detect and analyze a threat. In particular, many building automation sensors generally measure a space and can provide remote detection without line-of-sight or other geometric limitations that arise if a threat has moved from view or addition people have entered the space but have remained out of view. Building automation sensor integration may reduce the need for additional equipment (e.g., cameras) monitoring each perspective of a zone.

Machine vision models may be able to determine a number of people or make a detection within their field of view but may generally lack additional context leading up to and during the threat that can be used to evaluate risk factors relevant in determining a threat response. Machine vision models are not able detect pressure differentials caused by opening building doors, windows, or any other breech of the building envelope and may not be able to determine general activity levels of a space.

In some implementations, building automation sensors may include only a single timeseries of data, which may be less data that that of another video camera. Adding building automation sensor data to an existing machine vision system may require only a few extra weights (e.g., parameters) added to the model, which may include a significant reduction in processing compared to the computational expense of adding another convolutional neural network for additional cameras. Further, the parsimony of building automation sensors provides a significant reduction in data transfer and network traffic compared to video signals if more than one data source is to be processed in a centralized computer system.

Building Security System

Figure 1:
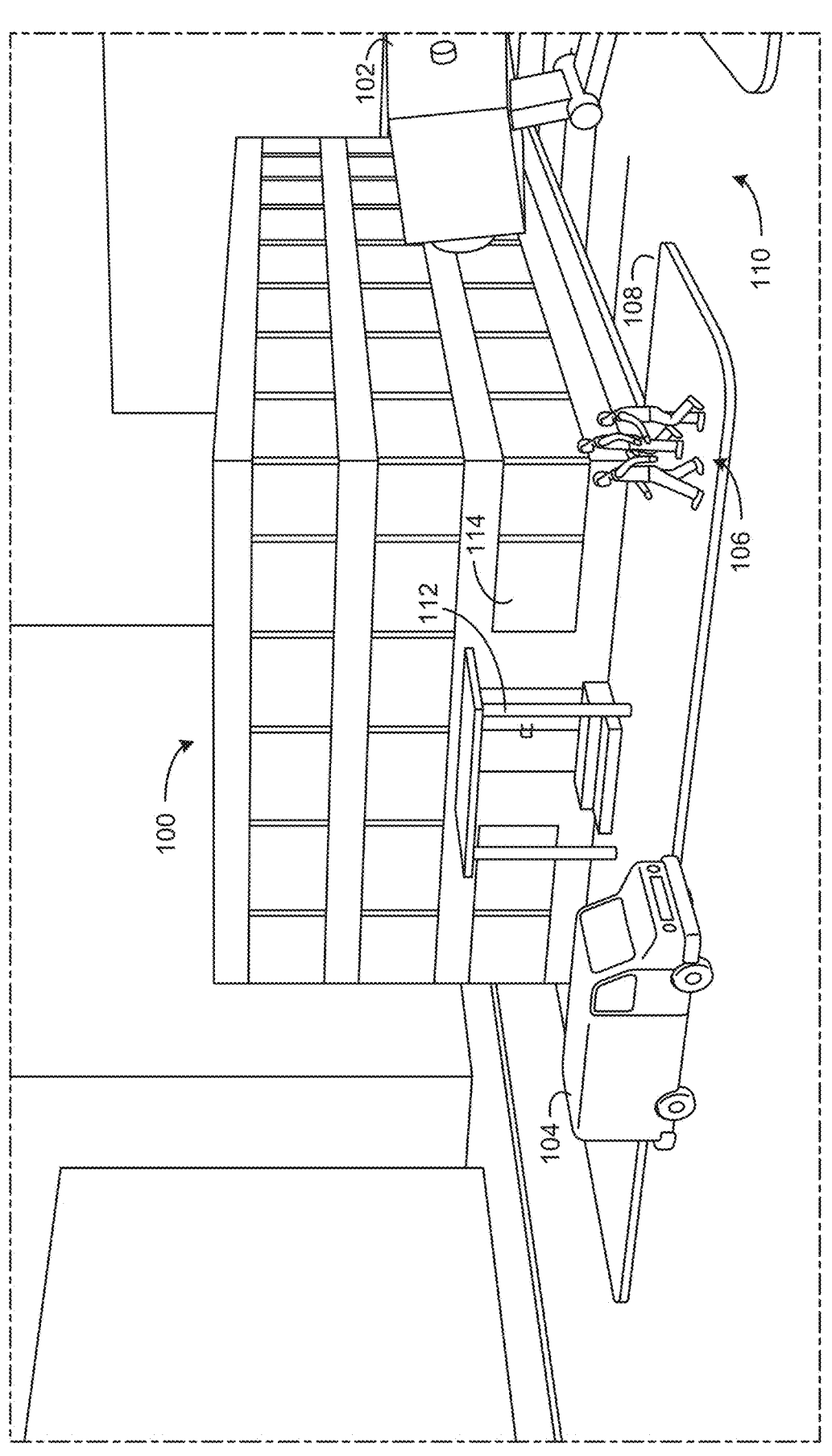
FIG. 1 is a perspective view schematic drawing of a building with a security system, according to some embodiments.

Referring now to FIG. 1, a building 100 with a security camera 102 and a parking lot 110 is shown, according to an exemplary embodiment. The building 100 is a multi-story commercial building surrounded by, or near, the parking lot 110 but can be any type of building in some embodiments. The building 100 may be a school, a hospital, a store, a place of business, a residence, a hotel, an office building, an apartment complex, etc. The building 100 can be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g., busses, cars, trucks, delivery vehicles). The building 100 and parking lot 110 can be further used by one or more pedestrians 106 who can traverse the parking lot 110 and/or enter and/or exit the building 100. The building 100 may be further surrounded, or partially surrounded, by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

Figure 2:
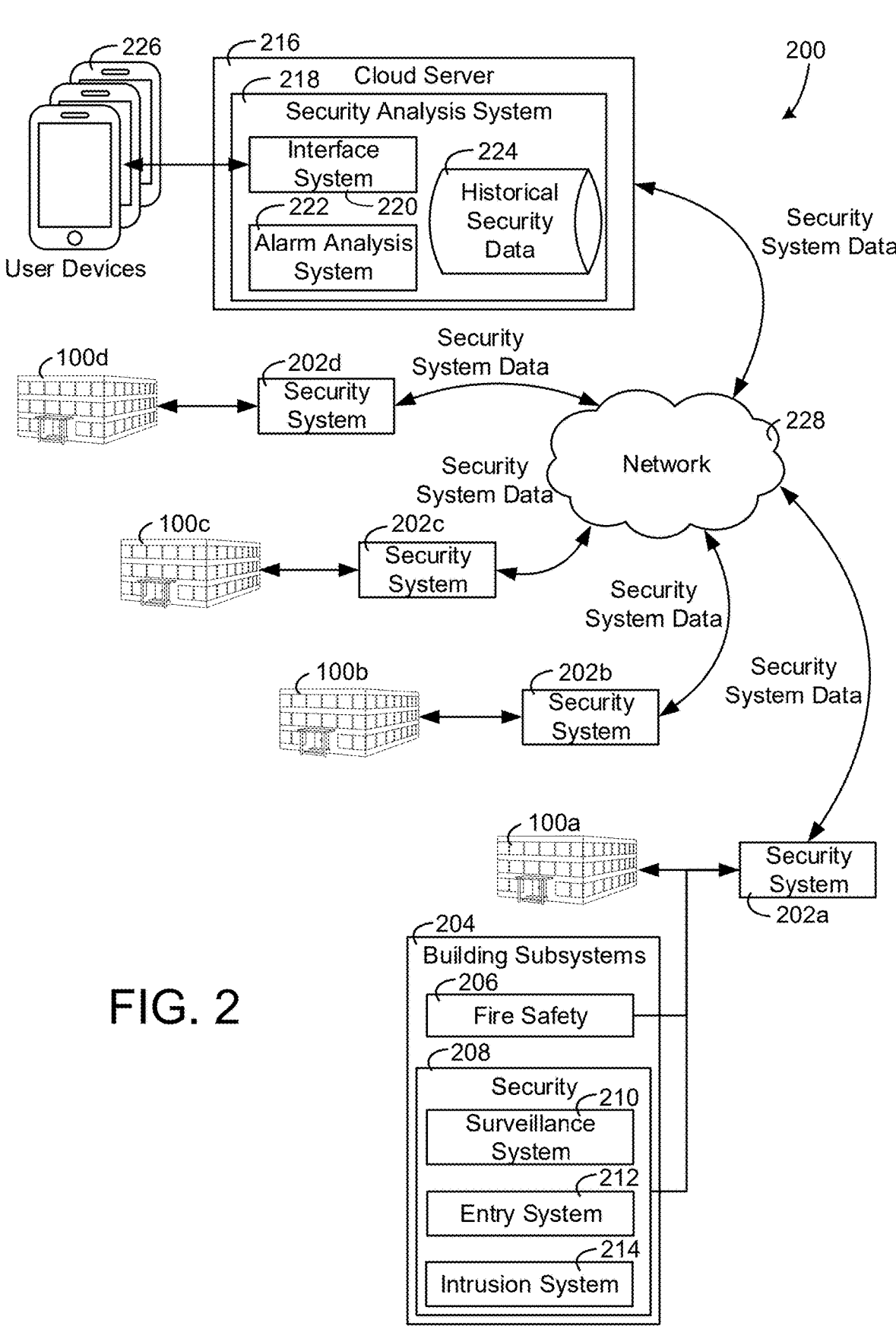
FIG. 2 is a block diagram of building security systems for multiple buildings communicating with a cloud-based security system, according to some embodiments.

Referring now to FIG. 2, a security system 200 is shown for multiple buildings, according to an exemplary embodiment. The security system 200 is shown to include buildings 100a-100d. Each of buildings 100a-100d is shown to be associated with a security system 202a-202d. The buildings 100a-100d may be the same as and/or similar to building 100 as described with reference to FIG. 1. The security systems 202a-202d may be one or more controllers, servers, and/or computers located in a security panel or part of a central computing system for a building.

The security systems 202a-202d may communicate with, or include various security sensors and/or actuators, building subsystems 204. For example, fire safety subsystems 206 may include various smoke sensors and alarm devices, carbon monoxide sensors, alarm devices, etc. Security subsystems 208 are shown to include a surveillance system 210, an entry system 212, and an intrusion system 214. The surveillance system 210 may include various video cameras, still image cameras, and image and/or video processing systems for monitoring various rooms, hallways, parking lots, the exterior of a building, the roof of the building, etc. The entry system 212 can include one or more systems configured to allow users to enter and exit the building (e.g., door sensors, turnstiles, gated entries, badge systems, etc.). The intrusion system 214 may include one or more sensors configured to identify whether a window or door has been forced open. The intrusion system 214 can include a keypad module for arming and/or disarming a security system and various motion sensors (e.g., IR, PIR, etc.) configured to detect motion in various zones of the building 100a.

Each of buildings 100a-100d may be located in various cities, states, and/or countries across the world. There may be any number of buildings 100a-100d. The buildings 100a-100d may be owned and operated by one or more entities. For example, a grocery store entity may own and operate buildings 100a-100d in a particular geographic state. The security systems 202a-202d may record data from the building subsystems 204 and communicate collected security system data to the cloud server 216 via network 228.

In some embodiments, the network 228 communicatively couples the devices, systems, and servers of the system 200. In some embodiments, the network 228 is at least one of and/or a combination of a Wi-Fi network, a wired Ethernet network, a ZigBee network, a Bluetooth network, and/or any other wireless network. The network 228 may be a local area network and/or a wide area network (e.g., the Internet, a building WAN, etc.) and may use a variety of communications protocols (e.g., BACnet, IP, LON, etc.). The network 228 may include routers, modems, and/or network switches. The network 228 may be a combination of wired and wireless networks.

The cloud server 216 is shown to include a security analysis system 218 that receives the security system data from the security systems 202a-202d of the buildings 100a-100d. The cloud server 216 may include one or more processing circuits (e.g., memory devices, processors, databases) configured to perform the various functionalities described herein. The cloud server 216 may be a private server. In some embodiments, the cloud server 216 is implemented by a cloud system or service.

A processing circuit of the cloud server 216 can include one or more processors and memory devices. The processor can be a general purpose or specific purpose processor, an application specific integrated circuit (ASIC), one or more field programmable gate arrays (FPGAs), a group of processing components, or other suitable processing components. The processor may be configured to execute computer code and/or instructions stored in a memory or received from other computer readable media (e.g., CDROM, network storage, a remote server, etc.).

The memory can include one or more devices (e.g., memory units, memory devices, storage devices, etc.) for storing data and/or computer code for completing and/or facilitating the various processes described in the present disclosure. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor via the processing circuit and can include computer code for executing (e.g., by the processor) one or more processes described herein.

In some embodiments, the cloud server 216 can be located on premises within one of the buildings 100a-100d. For example, a user may wish that their security, fire, or HVAC data remain confidential and have a lower risk of being compromised. In such an instance, the cloud server 216 may be located on-premises instead of within an off-premises cloud platform.

The security analysis system 218 may implement an interface system 220, an alarm analysis system 222, and a database storing historical security data 224, security system data collected from the security systems 202a-202d. The interface system 220 may provide various interfaces of user devices 226 for monitoring and/or controlling the security systems 202a-202d of the buildings 100a-100d. The interfaces may include various maps, alarm information, maintenance ordering systems, etc. The historical security data 224 can be aggregated security alarm and/or event data collected via the network 228 from the buildings 100a-100d. The alarm analysis system 222 can be configured to analyze the aggregated data to identify insights, detect alarms, reduce false alarms, etc. The analysis results of the alarm analysis system 222 can be provided to a user via the interface system 220. In some embodiments, the results of the analysis performed by the alarm analysis system 222 are provided as control actions to the security systems 202a-202d via the network 228.

Figure 3:
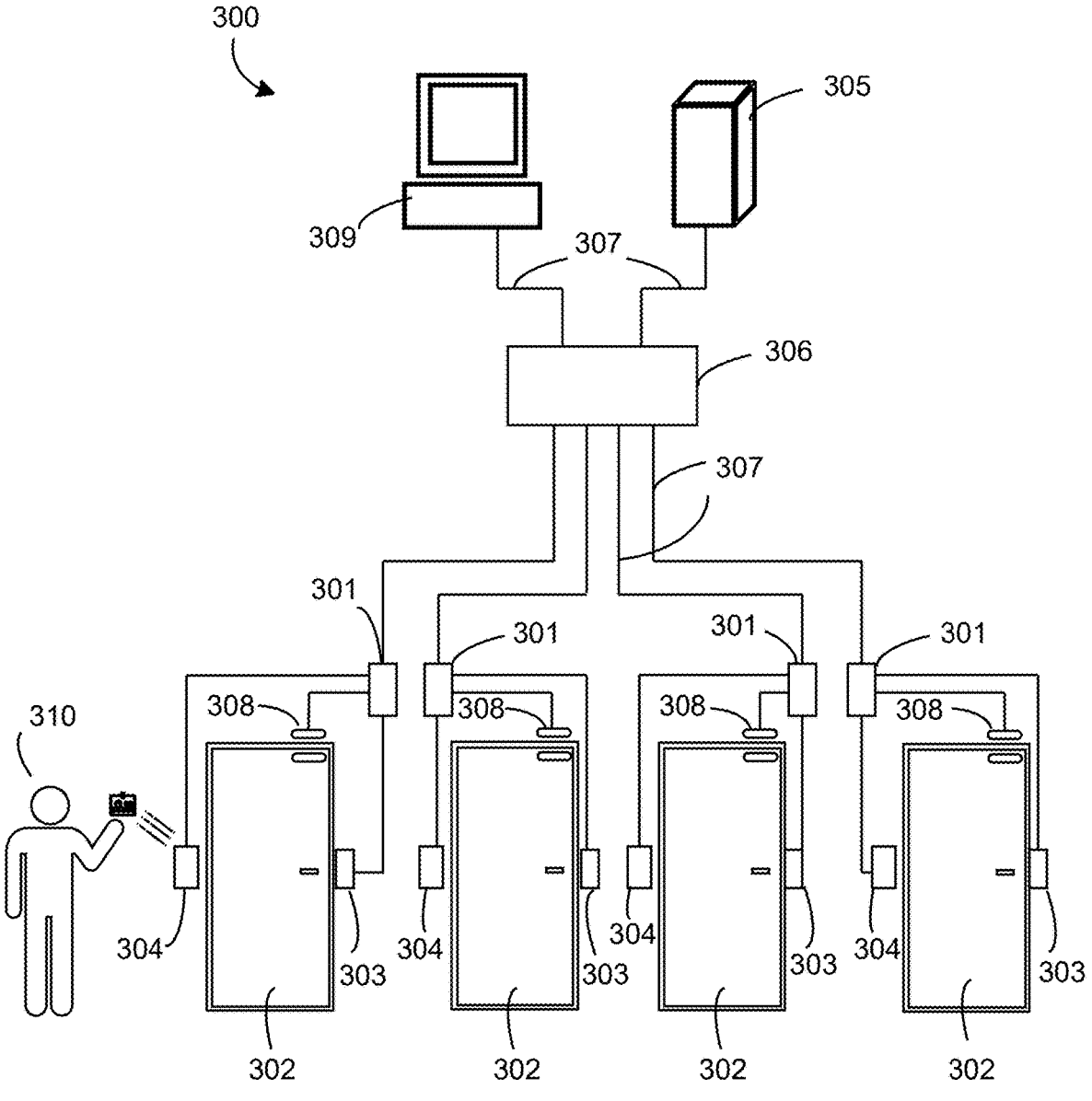
FIG. 3 is a block diagram illustrating several components of an access control system (ACS) that can be implemented in the building security systems of FIG. 2, according to some embodiments.

Referring now to FIG. 3, a block diagram of an ACS 300 is shown, according to an exemplary embodiment. The ACS 300 can be implemented in any of the buildings 100a-100d as described with reference to FIG. 2. The ACS 300 is shown to include a plurality of doors 302. Each of the doors 302 is associated with a door lock 303, an access reader module 304, and one or more door sensors 308. The door locks 303, the access reader modules 304, and the door sensors 308 may be connected to access controllers 301. The access controllers 301 may be connected to a network switch 306 that directs signals, according to the configuration of the ACS 300, through network connections 307 (e.g., physical wires or wireless communications links) interconnecting the access controllers 301 to an ACS server 305 (e.g., the cloud server 216). The ACS server 305 may be connected to an end-user terminal or interface 309 through network switch 306 and the network connections 307.

The ACS 300 can be configured to grant or deny access to a controlled or secured area. For example, a person 310 may approach the access reader module 304 and present credentials, such as an access card. The access reader module 304 may read the access card to identify a card ID or user ID associated with the access card. The card ID or user ID may be sent from the access reader module 304 to the access controller 301, which determines whether to unlock the door lock 303 or open the door 302 based on whether the person 310 associated with the card ID or user ID has permission to access the controlled or secured area.

Validating and Mitigating Threats Using Building Automation System Data

Figure 4:
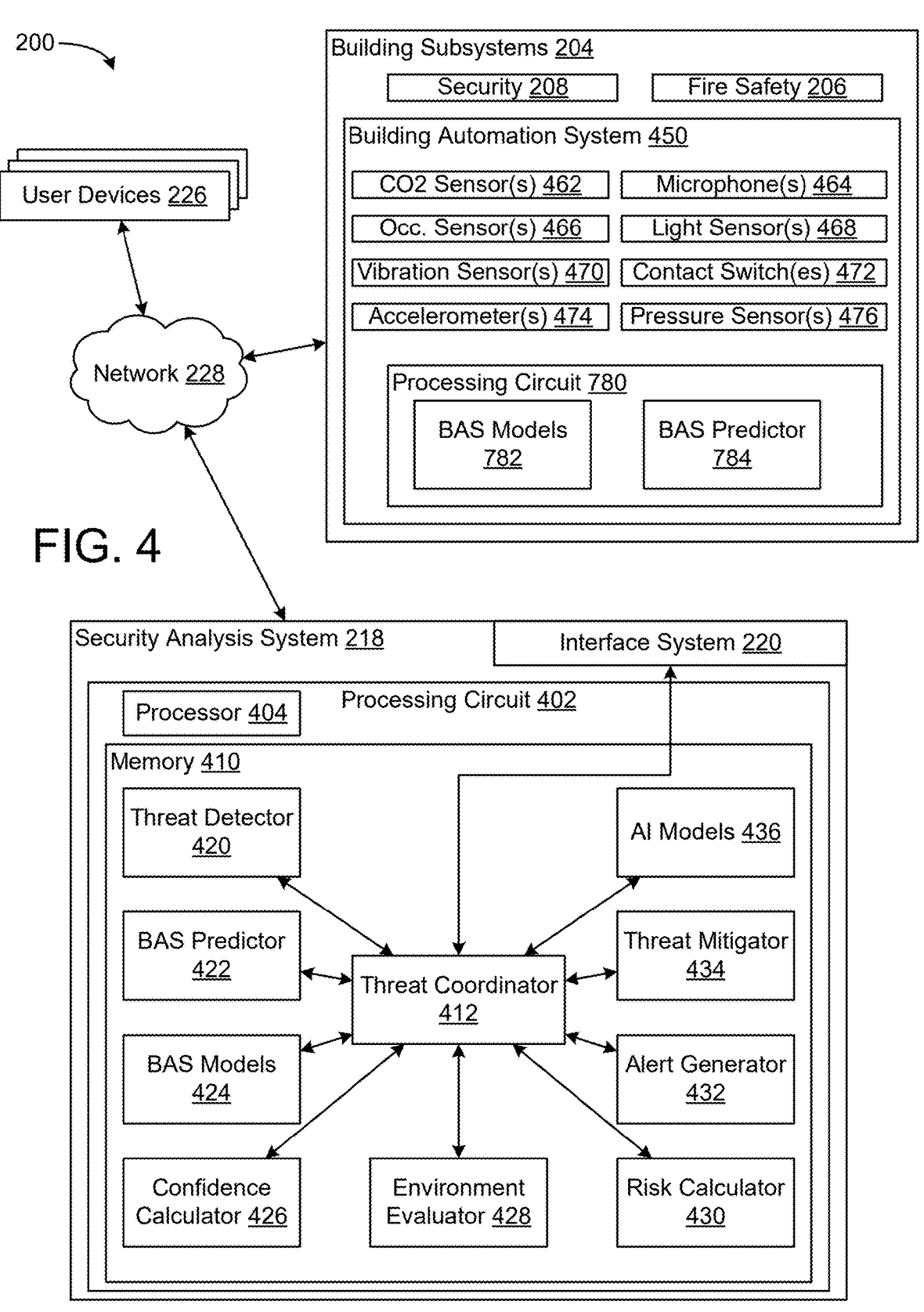
FIG. 4 is another block diagram of the building security system of FIG. 2 illustrating components that can be implemented to validate threats with building automation system data, according to some embodiments.

With reference to FIG. 4 the security system 200 is shown according to some embodiments. The security analysis system 218 is shown communicably coupled to the user devices 226 and building subsystems 204. The user devices, for example, may be used for monitoring and/or controlling the security systems. The building subsystems, for example, may provide additional security related data from a building automation system (BAS) 450. The security analysis system 218 may include a processing circuit 402 including one or more processors 404 and memory 410. The one or more processors 404 and memory 410 may be configured within cloud server 216 as previously described, the one or more processors 404 and memory 410 may be configured on one or more edge device (e.g., a camera of the surveillance system 210, a portion of the entry system 212, a portion of the intrusion system 214, a controller of the building automation system 450, etc.), or the one or more processors 404 and memory 410 may be distributed within any number of server architectures and edge devices.

According to some embodiments, the building automation system 450 includes a number of sensors that may be used to validate threats from the security analysis system. The building automation system may include, for example, one or more of $CO_2$ sensor(s) 462, microphone(s) 464, occupancy sensor(s) 466, light sensor(s) 468, vibrations sensor(s) 470, contact switch(es) 472, accelerometer(s) 474, pressure sensor(s) 476, etc. For example, the building automation system may provide (e.g., store, trend, stream, serve, etc.) data from the number of sensors over the network 228. The building automation system may additionally include one or more processing circuits 780 (e.g., in a controller, input-output module, smart actuator, etc.) to control and monitor the building subsystems 204. For example, the building control system may be configured to maintain a positive pressure, maintain indoor temperature at a supplied setpoint, and provide adequate ventilation for the occupants of the building. One or more sensor measurements can cross-validate threats detected by a security system increasing the confidence in the detection and any subsequent mitigating action taken.

A $CO_2$ sensor 462 may be used to measure (monitor, etc.) the $CO_2$ level in a space (e.g., room, zone, etc.) of a building. $CO_2$ levels may be indicative of the occupancy of an area and may be useful in the validation of security threats, for example, to validate if someone has entered an area and/or how many people may be in an area (or a relative occupancy level of an area). $CO_2$ levels may also be controlled, and ventilation increased to maintain a specific $CO_2$ level within the space. The current ventilation amount may also be correlated and/or indicative of the occupancy of a specific zone. $CO_2$ levels may also vary based on the activity level of the occupants. In some embodiments, $CO_2$ can be used to both estimate occupancy and activity within the space of a building.

A temperature sensor (or a thermostat) may be used to measure (monitor, etc.) the temperature level in a space (e.g., room, zone, etc.) of a building. During occupied time periods the temperature is typically controlled, and the work (e.g., heating and/or cooling) performed by the heating, ventilation and air conditioning (HVAC) system may be indicative of the occupancy and or activity within a space. During unoccupied time periods the temperature may not be controlled, and the temperature may correlate to the occupancy and/or activity within the space.

An occupancy sensor 466 may be configured to directly detect occupancy. Occupancy sensors 466 may use passive infrared technology, ultrasonic technology, photoelectric sensors, or similar technology to determine the presence and/or number of people in a space.

A microphone 464 and/or a vibration sensor 470 may be used by the BAS 450 to perform active noise cancelation. In some embodiments, the microphone 464 and/or the vibration sensor 470 can indirectly detect occupancy. The sound of people within a space may result in activation of any of these sensors. Alternatively or additionally, vibration sensors and/or accelerometers 474 may detect vibrations within the walls, floors, furniture, etc. of a space cause by the movements of individuals within a space. The magnitude of the response of such sensors may also be indicative of the condition of the space and activity level of the occupants. Light background noise or vibrations may be indicative of typical work patterns, more intense vibrations may indicate an increased level of activity of the occupants (e.g., excitement of a party, panic of a security threat, etc.).

A light sensor 468 may be used by the BAS 450 to determine the level of lighting required in a zone (e.g., advantageously dimming lights during times and/or in areas where outdoor light is abundant). In some embodiments, light sensors may indicate that a person has entered a space and turned on the lights. Light sensors may be particularly suited to determining occupancy at night and/or when lights are typically off.

In some embodiments, BAS have contact switches 472 to determine if windows are open and lock out (e.g., shut off) heating and/or cooling if a window is open. Opening of a contact switch 472 may also indicate that a person has entered a building space by entering through a window or door.

A BAS 450 may be configured to maintain a positive building pressure relative to the outdoor pressure. Positive pressure may prevent infiltration of unconditioned outdoor air which could increase energy usage and/or cause occupant discomfort. Maintaining building pressure may require a pressure sensor. Pressure sensors may react quickly to fluctuations in interior pressure, for example, if a door or window is opened and may be indicative of someone entering a space.

According to some embodiments, the building automation system 450 includes BAS models 782 and BAS predictor 784. The BAS predictor 784 may be configured to predict (e.g., estimate, determine, etc.) various conditions within the building under normal operations. The BAS predictor may be configured to predict, given the current operating conditions, the expected level of $CO_2$ in the zone, the heating (or cooling) load, the audible noise within a zone, the energy usage of a portion of the building, etc. Predictions may be performed based at least on the time of day, day of week, outdoor weather (e.g., as measured by the BAS or received from a weather service). For example, the expected occupancy at 3:00 PM on a Thursday may be twenty, whereas the expected occupancy at 2:00 AM on a Monday may be two. As another example, given the level of $CO_2$ in the zone (e.g., related to occupancy) and the outdoor temperature the current expected cooling load may be 15 kW. In some embodiments, the building automation system 450 is configured to learn correlations between various modes, states, conditions, and measurements in order to predict a mode, state, condition or measurement at a different time.

The BAS predictor 784 may be use the BAS models 782 to calculate (e.g., generate, estimate) the predictions. The BAS models 782 may provide templates, fitting functions, averages, etc. to the BAS predictor. For example, the BAS models 782 may use historical data to calculate the average noise levels as a function of time within a space. The BAS models may also perform parameter fitting (e.g., curve fitting, etc.) to generate functions trained for a specific building or space that can be used by the BAS predictor 784 to determine the prediction. Parameter fitting may be performed by the BAS models based on selected (e.g., filtered, etc.) historical data. The selected data may share one or more similar criteria. For example, the data may share a similar time of day, day of week, outdoor air temperatures, etc. In some embodiments, the BAS models include dynamic systems models of a condition or state of the building. For example, the temperature of a space may be expected to follow a first-order model, $dT/dt = -a(Toa - T) + dQ/dt$, where T is the indoor temperature, Toa is the outdoor temperature, $dQ/dt$ is the heating provided to the space, and a is a parameter for the system. Alternatively or additionally, other dynamic system models (e.g., auto-regressive models, state-space models, etc.) may be identified and used to predict the temperature of the space.

Still referring to FIG. 4, the security analysis system includes a threat detector 420, a BAS predictor 422, BAS models 424, a confidence calculator 426, an environment evaluator 428, a risk calculator 430, an alert generator 432, threat mitigation 434, artificial intelligence (AI) models 436, and threat coordinator 412. The components may, for example, be instructions stored in memory 410 that when executed by the one or more processors 404 cause the security analysis system 218 to perform threat detection, validation, and/or mitigation.

In some embodiments, the security analysis system 218 includes the threat coordinator 412. The threat coordinator 412 may be configured to control the timing and flow of data through the other components of security analysis system 218. For example, threat coordinator 412 may cause the components or circuits to execute in a specific order to detect, validate, and/or mitigate threats using BAS data. In some embodiments, threat coordinator 412 may route the information and/or outputs of other components that are dependent on the information or use the information as an input. Instructions, modules, portions of memory, etc. described as configured to perform a function (or described as performing the function) may include embodiments for which the module is configured to cause the performance of the function (or is causing the performance of the function). Similarly, instructions, modules, portions of memory, etc.

described as configured to cause the performance of a function (or described as causing the performance of a function) may include embodiments for which the module is configured to perform the function (or is performing the function).

In some embodiments, the threat detector 420 is configured to detect various security threats. The threat detector 420 may detect people, animals, and objects that may be indicative of a threat condition. For example, the threat detector 420 may detect an unrecognized person, tailgating entry, an intrusion, a weapon (e.g., knife, firearm, etc.), an explosive, dangerous animals, etc. The threat detector 420 may communicate a type of threat (e.g., weapon, explosive, intrusion) and an uncertainty level of the threat (e.g., confidence that the threat is not a false alarm). In some embodiments, the threat detector 420 is configured to additionally determine various scene tags (e.g., conditions, environment types, bystanders, etc.) related to the current situation at the scene of the threat.

The threat detector 420 may use image capture devices, (e.g., cameras, video recorders, etc.), motion sensors, limit switches, badge access gates, etc. to detect a threat. The threat detector 420 may include various artificial intelligence (AI) approaches, for example, rule-based approaches (e.g., badging of an expired card) and/or machine learning approaches (e.g., a convolutional neural network) can be used or combined. For example, the threat detector 420 may perform template matching to determine a type of scene, count a number of bystanders in a space, etc. In some embodiments, the threat detector 420 may, additionally or alternatively, use machine vision techniques to detect a threat, determine the uncertainty, and/or apply scene tags. The threat detector 420 may use the AI models 436 stored in the security analysis system. For example, the threat detector 420 may determine a threat using a convolutional neural network (CNN) to detect weapons being carried into a location. The CNN may additionally determine how confident it is in the detection of the threat. Detection of an exposed firearm, for example, may result in a threat confidence that is greater than detecting a contour having the form of a weapon in a pocket. Machine vision techniques (e.g., a CNN) can also be used to determine environment aspects of the scene of the threat. Scene tags can be used to determine the risk of a detected threat. For example, some threats (e.g., a weapon or explosive) may entail higher risk if more people are at the scene, other threats (e.g., a covert intrusion) may entail a higher risk no people are at the scene.

In some embodiments, the BAS predictor 422 is configured to predict (e.g., estimate, determine, etc.) various conditions within the building under normal operations. For example, the BAS predictor 422 may perform the same or similar functionality as the BAS predictor 784 of the BAS 450 (e.g., using local BAS models 424). The BAS predictor 422 may be configured to perform additional or alternative functions. The BAS predictor 422 may perform functionality required by the security analysis system 218 that the BAS 450 would not otherwise require. In some embodiments, the BAS predictor 422 may be implemented on a cloud server architecture and have access to more computational power and/or more memory that the processing circuit 780 of the BAS 450. The BAS predictor 422 may, for example, use an machine learning model (e.g., a transformer, a long-short term memory (LSTM) model etc., from AI models 436) to predict the expected conditions within the building.

The BAS predictor 422 may predict the expected conditions within a building or space thereof during a period of a threat. For example, the BAS predictor 422 may increase, decrease, or otherwise adjust an expected measurement from one of the sensors of the BAS 450. In some embodiments, the BAS predictor 422 may predict the expected conditions within the building under normal operations and then adjust that prediction based on the threat. In some embodiments, the BAS predictor 422 may receive the expected conditions within the building under normal operations from the BAS 450 (e.g., using BAS predictor 784) and then adjust that prediction based on the threat. In some embodiments, the BAS predictor 422 may receive the expected conditions within the building under normal operations from the BAS 450 (e.g., using BAS predictor 784) for certain conditions (e.g., a temperature) and predict other conditions within the building under normal operations.

In some embodiments, the confidence calculator 426 is configured to determine a confidence metric related to the threat. The confidence metric, for example, may be used to validate the threat detection from the threat detector 420. The confidence calculator 426 may be configured to determine a confidence metric based at least on the threat uncertainty of the threat detector 420 and/or the expected measurements from the BAS predictor 422. The confidence calculator 426 may compare the expected measurements with the actual current conditions at the scene of the threat and determine a confidence metric based on the comparison. For example, the confidence calculator 426 may increase the confidence if the confidence based on a distance metric between the measurements and the expected measurements. In some embodiments, the distance metric may be an algebraic difference at the current time. In some embodiments, the comparison may depend on a trend (e.g., time-series, recent history) of measurements and expected measurements and the distance metric could be based on a comparison of the two timeseries (e.g., using an integrated absolute difference of the timeseries).

In some embodiments, confidence calculator 426 is configured to use the expected measurements and if the measurements are expected to increase or decrease given the threat. For example, if there is the threat of a weapon the noise level may increase (e.g., from the alarmed state of other occupants), the confidence calculator 426 may increase the confidence metric in response to the noise level increasing. The amount of increase may depend on the amount of increase (or decrease, if a decrease in the measurement is expected based on the threat) in the measurements or the amount of increase may be fixed and be applied responsive to the increase in the measurement being greater than a threshold. In some embodiments, the confidence calculator 426 may use a neural network to generate a confidence metric. For example, a neural network can be used to perform the comparison between the expected measurements and the actual measurements and/or to combine the results of the comparison with the threat uncertainty from the threat detector 420.

In some embodiments, the confidence metric may be a discrete value (e.g., validated or not validated). The threat may be considered validated if the original threat uncertainty was low, the match between the actual measurements and the expected measurements is high (e.g., the distance metric low), or a combination thereof.

In some embodiments, the environmental evaluator 428 is configured to determine an environmental risk based on the output of the threat detector 420 (e.g., scene tags) and/or current building conditions (e.g., actual measurements from the BAS 450). The environmental evaluator 428 may determine the number of people and/or amount of property at the scene of the threat and determine an environmental risk score. The type of threat may also be used to determine an environmental risk. The threat type, for example, may indicate if there is a threat to the well-being of people, property loss, or both. In some embodiments, the environmental risk may be numeric (e.g., number of people at the scene, potential property damage, an environmental risk score etc.). In some embodiments, the environmental risk may be an enumeration (e.g., elevated or neutral; low, mid, high; etc.). In some embodiments, the environmental evaluator 428 uses a neural network trained to determine an environmental risk.

The security analysis system 218 may include the risk calculator 430. The risk calculator 430 may be configured to determine (e.g., calculate, generate, etc.) the overall risk score based on the environmental risk, the confidence metric, and or the threat type. For example, the risk calculator 430 may multiply the confidence (e.g., a probability that the threat is real) by the environmental risk (e.g., a type of cost function). In some embodiments, the risk calculator 430 may calculate an overall risk score related to the need for the system to initiate an action (e.g., initiate a mitigating action, generate a notification, etc.). The risk calculator 430 can use any type of function to determine the risk score (e.g., a mathematical function, a computer algorithm, etc.). In some embodiments, the risk calculator 430 uses a neural network trained to classify a threat as being high risk based on the input information.

In some embodiments, the security analysis system 218 includes an alert generator 432 and/or a threat mitigator 434. For example, the alert generator 432 and/or the threat mitigator 434 may be used to initiate a responsive action if the risk score and/or confidence metric are above a threshold or if the threat is otherwise determined to be validated. The alert generator 432 may be configured to generate alerts (e.g., notifications, announcements, messages, etc.). The alert generator 432 may be configured to send an email, text message, etc. to personnel that could be affected by the threat. In some embodiments, the alert generator 432 may communicate directly with wearable devices (e.g., badges, watches, etc.) and cause them to alert personnel and/or bystanders of the threat. The alert generator 432 may generate an alarm and/or announcement using the security subsystem 208 or other building system suitable for generating an audible alert.

The threat mitigator 434 may be configured to initiate a mitigating action to reduce the risk of a threat. The threat mitigator 434 may highlight exit plans to ensure people are able to evacuate the building quickly and safely. The threat mitigator 434 may contact the police and/or fire departments. The threat mitigator 434 initiate a tracking algorithm to follow the threat and/or assist first responders. The threat mitigator 434 may close and/or lock doors to isolate the threat. The threat mitigator may reduce lighting levels (e.g., by communicating to BAS 450) to make it more difficult for the threat to navigate or increase lighting levels to make it easier for first responders to navigate. Any other suitable action may be taken by the threat mitigator 434 in response to the confidence metric or risk score being greater than a threshold or the threat otherwise determined to be validated.

Figure 5:
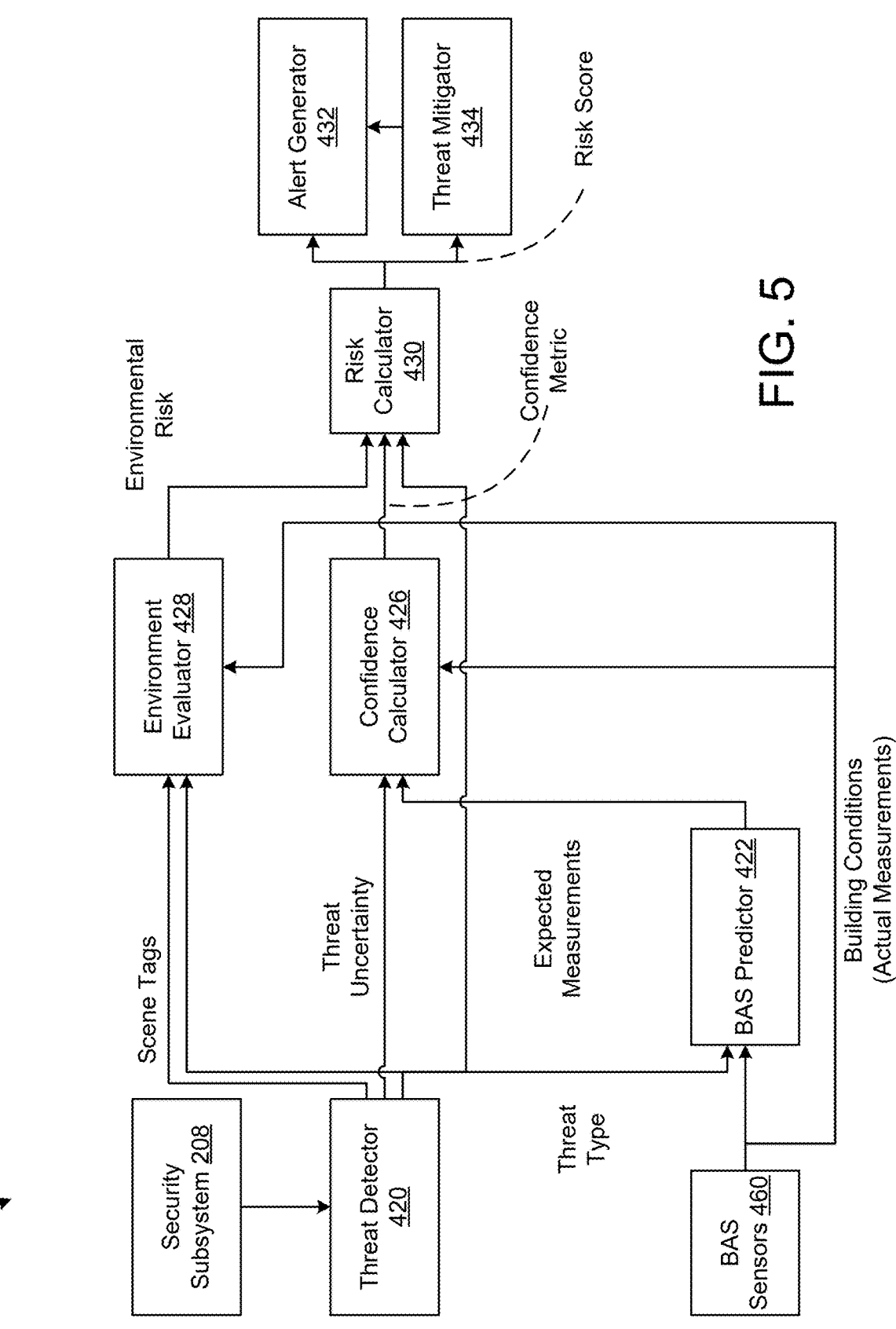
FIG. 5 is a block diagram of the security analysis system of FIG. 4 illustrating the flow of data through components of the security analysis system, according to some embodiments.

FIG. 5 is illustrative of data flow between the components of the security analysis system 218, according to some embodiments. Information (e.g., data, sensor signals, images or sequences thereof, etc.) may be collected by the security subsystem 208 and received by the threat detector 420. For example, the threat detector 420 may use image capture devices, (e.g., cameras, video recorders, etc.), motion sensors, limit switches, badge access gates, etc. of the security subsystem 208 to detect a threat. The output of threat detector may include a threat type (e.g., weapon, explosive, intrusion) an uncertainty level of the threat (e.g., confidence that the threat is not a false alarm) and scene tags (e.g., conditions, environment types, bystanders, etc.) related to the current situation at the scene of the threat. The analysis of the threat validation components of the security analysis system 218 may begin with a positive identification from the threat detector 420.

The BAS predictor 422 (or, in some embodiments BAS predictor 784) may receive a threat type from the threat detector 420. Responsive to the threat type, the BAS predictor 422 may request (e.g., poll, message, etc.) information (e.g., current measurements, etc.) from the BAS sensors 460. The BAS predictor 422 may generate (e.g., predict, estimate, etc.) expected building conditions (e.g., as described with reference to FIG. 4). In some embodiments, the expected building conditions are a scalar (e.g., a single value for each condition used, a timeseries (e.g., including a recent past history of the condition), or a combination of scalars and timeseries dependent on the condition. In some embodiments, the BAS Predictor 422 uses current building conditions to generate the expected conditions during a threat. For example, a prediction may start at (e.g., at the current time) the current value received from the BAS sensors 460 to avoid discontinuities in the prediction. The BAS predictor may predict a scalar value that is greater than the current condition if the threat is expected to cause an increase in the measurement (or less that the current conditions if the threat is expected to cause a decrease in the measurement).

The confidence calculator 426 may receive the threat uncertainty from the threat detector 420. The threat uncertainty may indicate an initial confidence that the threat is real (e.g., prior to validation with data from the BAS 450). The confidence calculator 426 may additionally receive expected measurements from the BAS predictor 422 and actual measurements from the BAS sensors 460. The expected measurements may either be expected measurements given the threat is occurring or expected measurements under normal operating conditions. The confidence calculator 426 may additionally receive the threat type from the threat detector 420 or the BAS predictor 422 (e.g., if expected measurements during normal operating conditions are given).

In some embodiments, the confidence calculator 426 can perform a comparative analysis between the expected measurements given the threat type and the actual measurements. As previously described the confidence calculator 426 may us a difference or a distance metric to compare the expected and actual measurements. In some embodiments, the confidence calculator may validate the threat based on the comparative analysis and directly cause the alert generator 432 or the threat mitigator 434 to initiate an action. As shown in FIG. 5, the confidence calculator 426 may generate a confidence metric for use by the risk calculator 430 and/or to compare to a threshold before initiating an action.

In some embodiments, the confidence calculator 426 may include weights (e.g., parameters) that can be tuned to adjust the overall importance given to the inputs. For example, the weights could be used to adjust the importance of the threat uncertainty from the threat detector 420 and the amount of match between the expected measurements from the BAS predictor 422 and the actual measurements from the BAS sensors 460. The weights may be selected based on other criteria such individual customer tolerance of risk, propensity for false alarms, etc. The weights may be chosen to minimize an objective function (e.g., performing least squares fitting between labels in training data and the output of the confidence calculator 426). The weights may also be weights of a neural network trained match labeled training data. For example, training data may include a threat detection output, BAS measurements, and a label representing if the threat was real or a false alarm.

The environment evaluator 428 may receive a threat type and scene tags from the threat detector 420 to generate an environmental risk score. In some embodiments, the environmental risk score may depend on the building sensors in addition to or instead of the outputs of the threat detector 420. The environment evaluator 428 may produce an environmental risk representing an adjustment and/or enhancement that may affect the overall risk score based on environmental factors (e.g., number of occupants, potential for property damage, etc.).

The risk calculator 430 may calculate an overall risk score that can be compared to threshold or otherwise processed to determine if there is a need to initiate a mitigating action. The risk calculator may receive the environmental risk from the environment evaluator 428, the confidence metric from the confidence calculator 426, and/or the threat type from the threat detector 420. In some embodiments, the risk calculator 430 may include weights (e.g., parameters) that can be tuned to adjust the overall importance given to the types of threats, the environmental risk, and/or the confidence score when deciding the overall risk score. The weights may be weights of a neural network trained to produce a target overall risk score in labeled training data. The weights may be single weights that multiply the inputs of the risk calculator 430. Single weights may be trained similar to a neural network wherein gradient descent is used to adjust the weights to produce outputs as in the labels of the training data. Single weights may also be selected base on other criteria such individual customer tolerance of risk, propensity for false alarms, etc. The risk calculator 430 may initiate an action based on the magnitude of the risk (e.g., by comparison to a threshold) (e.g., using or signaling the alert generator 432 or the threat mitigator 434 to initiate an action).

Figure 6:
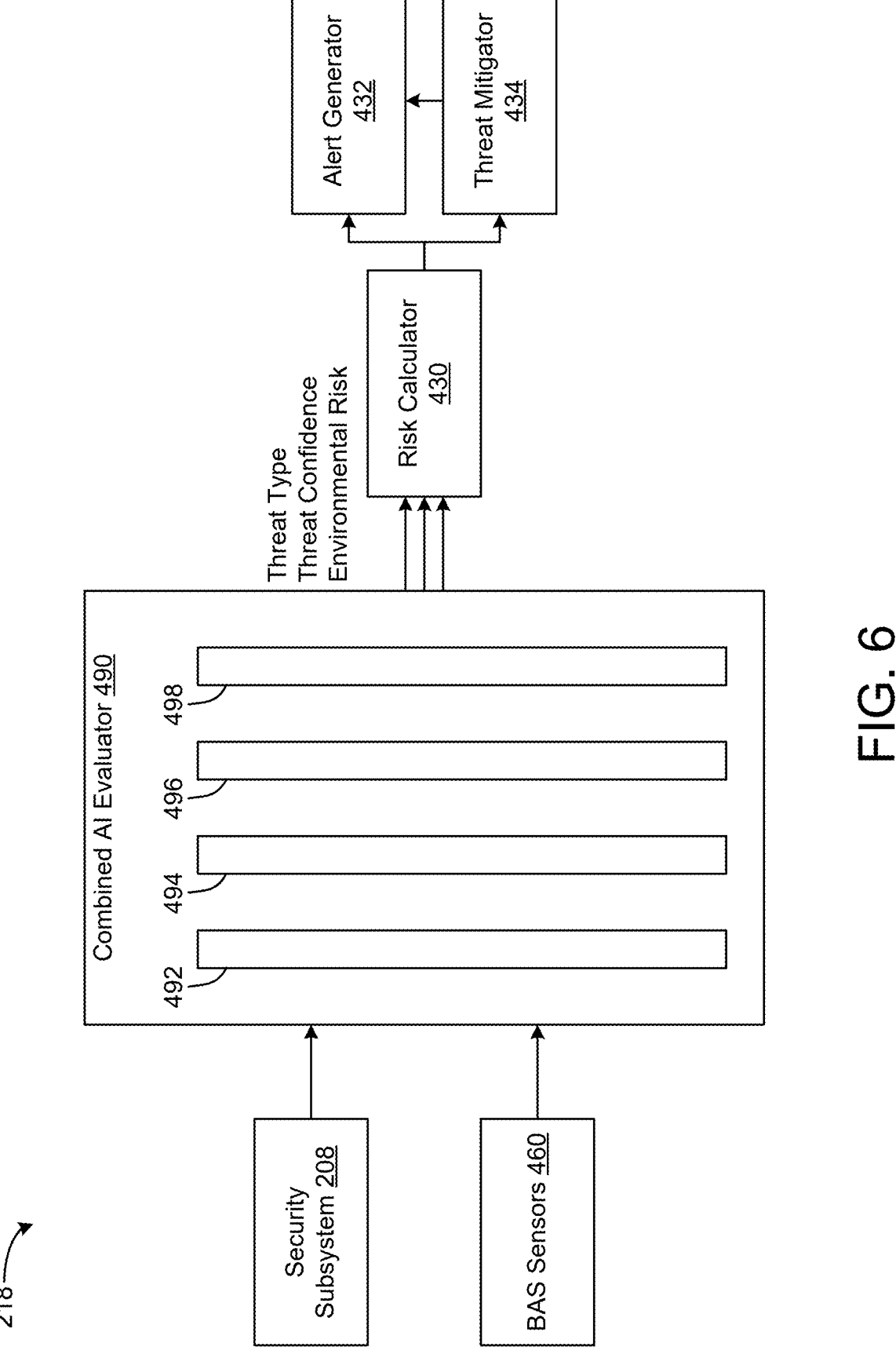
FIG. 6 is a block diagram of the security analysis system of FIG. 4 illustrating a combined analysis using artificial intelligence, according to some embodiments.

FIG. 6 is also illustrative of data flow between the components of the security analysis system 218, according to some embodiments. The security analysis system 218 may combine a number of components into a combined AI evaluator 490. For example, the combined AI evaluator 490 may be configured to obtain (e.g., receive, request, poll, etc.) data (e.g., sensor signals, images or sequencies thereof, etc.) collected by the security subsystem 208 and obtain data from the BAS sensors 460 (e.g., building conditions, weather data, etc.) and generate a threat type, threat confidence, and/or environmental risk. The combined AI evaluator can include a number of layers (e.g., layers 492, 494, 496, and 498) of various architectures. For example, the layers can include encoder layers, attention layers, decoder layers, fully connected layers, convolutional layers, classification layers, pooling layers, etc.

It is noted that while a combined AI evaluator 490 may not have explicitly defined calculations or components that perform specific calculations the combined AI evaluator may detect a possible threat (e.g., by evaluating video data from the security subsystem) as detecting a nonzero threat confidence may indicate a potential threat. An AI evaluator may encode (e.g., within the weights) expected measurements of the building sensors and improve prediction capability based on a calculation (e.g., comparison) between the weights (encoding the expected results) and the actual BAS measurements from BAS sensors 460.

The combined AI evaluator 490 may be trained to calculate based a confidence score based on training data that includes examples of security subsystem data and BAS sensor data real threats and false positives. In some embodiments, the data may be manufactured. For example, by a simulation, manually, or using a generative AI architecture to produce additional training samples. For example, a person may manually generate BAS training data that is consistent with a threat and/or is inconsistent with a threat and provide target confidence scores (or labels indicating if the threat is real) for these training data. In some embodiments, some training data can be manually collected and/or created (e.g., through simulation) and some training data can be created using generative AI. For example, some training data may be generated using a generative model trained adversarial network training approach.

The confidence score may be used to validate the threat based on the comparative analysis and directly cause the alert generator 432 or the threat mitigator 434 to initiate an action (e.g., as described with reference to FIG. 5). The combined AI evaluator 490 may generate a confidence metric for use by the risk calculator 430 and/or to compare to a threshold before initiating an action. In some embodiments, the risk calculator 430 may calculate an overall risk score that can be compared to threshold or otherwise processed to determine if there is a need to initiate a mitigating action. The risk calculator may receive the environmental risk, the confidence, and/or the threat type from the combined AI evaluator 490. The risk calculator 430 may initiate an action based on the magnitude of the risk (e.g., by comparison to a threshold) using the threat mitigator 434 and/or the alert generator 432.

With reference to FIG. 7, a flow of operations 500 may be used to validate a threat and initiate an action based on the validation according to some embodiments. The flow of operations 500 can be executed by the security analysis system 218, for example. Operations within the flow of operations 500 can be distributed across multiple components of the security analysis system 218 and/or executed by an individual component.

In some embodiments, the flow 500 includes detecting a possible threat by evaluation video data using one or more artificial intelligence models in an operation 502. For example, the threat detector 420 can be used to perform the operation 502. People, animals, and objects may be detected indicative of a threat condition. For example, an unrecognized person, tailgating entry, an intrusion, a weapon (e.g., knife, firearm, etc.), an explosive, dangerous animals, etc. are all potential threats that may be detected in the operation 502. Image capture devices, (e.g., cameras, video recorders, etc.), motion sensors, limit switches, badge access gates, etc. may be used to detect a threat. For example, by executing various artificial intelligence (AI) approaches including, rule-based approaches (e.g., badging of an expired card) or machine learning approaches (e.g., a convolutional neural network) individually or in a combined approach.

In some embodiments, the flow 500 includes determining, based on the type of the possible threat, an expected measurement for a building sensor associated with a location of the possible threat in an operation 504. The operation 504 can, for example be performed by the BAS predictor 422. For example, known measurement patterns (e.g., daily occupant cycles, responses to outdoor conditions, etc.) may be used to generate (e.g., estimate, predict) expected measurements under normal operations. The expected measurements may either be increased or decreased based on the type of the possible threat.

The flow 500 may include calculating a threat confidence metric based on the expected measurement for the building sensor and an actual measurement for the building sensor in an operation 506. The operation 506 can, for example be performed by the confidence calculator 426. The difference between the actual and expected measurement may be used to calculate the threat confidence metric, for example, by validating the threat detection (e.g., by increasing the confidence of the original detection, setting the confidence to 100%). In some embodiments, the expected measurement may be an amount of increase in current or the typical sensor measurements. The amount of increase or decrease of a sensor measurement for a threat type can be compared to the actual increase or decrease to calculate the threat confidence metric. For example, validating the threat (e.g., by increasing the confidence of the original detection, setting the confidence to 100%) if the increase or decrease in the metric exceeds a threshold or by increasing the confidence by a function of the increase or decrease in the measurement. In some embodiments, the expected measurements and/or the actual measurement may be a timeseries (e.g., of recent past data) and the comparison is done based on a distance metric between two timeseries (e.g., integrated absolute differences).

In some embodiments, the confidence metric may be calculated by a neural network (e.g., trained based on training data with threats labeled as real or false alarms). In some embodiments, the confidence metric calculation may include weights that are used to vary the importance of the individual inputs in the confidence metric calculation. The weights may be tuned based by the developer based on simulations, etc. or the weights may be chosen to minimize an objective function (e.g., performing least squares fitting between labeled threats or by minimizing a cross-entropy loss).

The flow 500 may include calculating a risk score based on the type of the possible threat, the threat confidence metric, and/or the location of the possible threat in an operation 508. The operation 508 can, for example, be performed by the risk calculator 430. The overall risk score may be determined based on the environmental risk, the confidence metric, and or the threat type. For example, the confidence metric (e.g., a probability that the threat is real) may be multiplied by the environmental risk (e.g., a type of cost function). In some embodiments, the risk score may be calculated by a neural network (e.g., trained based on training data with human labeled risk scores). In some embodiments, the risk score calculation may include weights that are used to vary the importance of the individual inputs in the overall risk score calculation. The weights may be selected based on criteria such individual customer tolerance of risk, propensity for false alarms, etc. The weights may be chosen to minimize an objective function (e.g., performing least squares fitting between labeled risk in training data and the output of the confidence calculation).

The flow 500 may include initiating an action based at least on a magnitude of the threat confidence metric or a magnitude of the risk score in an operation 510. For example, alerts (e.g., notifications, announcements, messages, etc.) by the alert generator 432. An email, text message, etc. may be sent to personnel that could be affected by the threat. In some embodiments, the alerts may be communicated to wearable devices (e.g., badges, watches, etc.) and cause them to alert personnel and/or bystanders of the threat. Police, fire departments, and/or other emergency services may be contacted. A tracking algorithm to follow the threat and/or assist first responders. In some embodiments, the flow 500 includes sending a command to a building automation system 450 based at least on a magnitude of the threat confidence metric or a magnitude of the risk score in operation 512. For example, doors may be closed and/or locked doors to isolate the threat. Lighting levels (e.g., by communicating to BAS 450) may be reduced to make it more difficult for the threat to navigate or increased lighting levels to facilitate navigation by first responders. Any other suitable action may be taken in response to the confidence metric or risk score being greater than a threshold or the threat otherwise validated.

With reference to FIG. 8, a flow of operations 600 may be used to validate a threat and initiate an action based on the validation according to some embodiments. The flow of operations 600 can be executed by the security analysis system 218, for example. Operations within the flow of operations 600 can be distributed across multiple components of the security analysis system 218 and/or executed by an individual component.

In some embodiments, the flow 600 includes detecting a possible threat by evaluation video data using one or more artificial intelligence models in an operation 602. For example, the threat detector 420 can be used to perform the operation 602. People, animals, and objects may be detected indicative of a threat condition. For example, an unrecognized person, tailgating entry, an intrusion, a weapon (e.g., knife, firearm, etc.), an explosive, dangerous animals, etc. are all potential threats that may be detected in the operation 602. Image capture devices, (e.g., cameras, video recorders, etc.), motion sensors, limit switches, badge access gates, etc. may be used to detect a threat. For example, by executing various artificial intelligence (AI) approaches including, rule-based approaches (e.g., badging of an expired card) or machine learning approaches (e.g., a convolutional neural network) individually or in a combined approach.

In some embodiments, the flow 600 includes calculating a threat confidence metric based on a measurement for a building sensor associated with a location of the possible threat and the evaluation of the video data in an operation 604. For example, known measurement patterns (e.g., daily occupant cycles, responses to outdoor conditions, etc.) may be used to generate (e.g., estimate, predict) expected measurements under normal operations at the location of the threat and compared to the actual building sensors to generate a confidence score. In some embodiments, the measurement from the building sensor may be included with the video data (e.g., from a camera of the security subsystem 208) and processed by a machine learning model trained to output a confidence metric. Expected measurements (e.g., from BAS predictor 422) may be included with the video data and measurements from the building sensors and/or the expected measurements may be represented (e.g., implicitly) by the weights of the machine learning model.

The machine learning model may be trained by a suitable training technique (e.g., stochastic gradient descent) using training data where a confidence score is known and/or the validity of the threat is labeled as a true threat or not a threat. The weights of the machine learning model may be adjusted to reduce a loss score over the training data. For example, a least squares loss or a binary cross entropy loss may be used depending on the type of labels in the training data.

In some embodiments, the flow 600 includes calculating an environmental risk factor (e.g., score, metric, etc.) based on the measurement for the building sensors and the evaluation of the video data in operation 606. The operation 606 for example may be performed by the environment evaluation 428. The environmental risk factor may cause an increase to the risk of the threat based on the conditions at the location of the threat (e.g., a number of people, potential for property damage, etc.).

The flow 600 may include calculating a total risk based on a threat type, the threat confidence metric, and the environment risk factor an operation 608. The operation 608 can, for example, be performed by the risk calculator 430. The total risk may be determined based on the environmental risk, the confidence metric, and/or the threat type. For example, the confidence metric (e.g., a probability that the threat is real) may be multiplied by the environmental risk (e.g., a type of cost function) that depends on the threat type. In some embodiments, the total risk may be calculated by a neural network (e.g., trained based on training data with human labeled risk scores). In some embodiments, the risk score calculation may include weights that are used to vary the importance of the individual inputs in the overall risk score calculation. The weights may be selected based on criteria such individual customer tolerance of risk, propensity for false alarms, etc. The weights may be chosen to minimize an objective function (e.g., performing least squares fitting between labeled risk in training data and the output of the confidence calculation).

The flow 600 may include initiating an action responsive to a total risk or the threat confidence metric exceeding a threshold in an operation 610. For example, alerts (e.g., notifications, announcements, messages, etc.) by the alert generator 432. An email, text message, etc. may be sent to personnel that could be affected by the threat. In some embodiments, the alerts may be communicated to wearable devices (e.g., badges, watches, etc.) and cause them to alert personnel and/or bystanders of the threat. Police, fire departments, and/or other emergency services may be contacted. A tracking algorithm to follow the threat and/or assist first responders. The flow 600 may also include sending a command to a building automation system 450 responsive to a total risk exceeding a second threshold in operation 612. For example, doors may be closed and/or locked doors to isolate the threat. Lighting levels (e.g., by communicating to BAS 450) may be reduced to make it more difficult for the threat to navigate or increased lighting levels to facilitate navigation by first responders. Any other suitable action may be taken in response to the confidence metric or risk score being greater than a threshold or the threat otherwise validated.

In some embodiments, the data from a potential threat that is not validated (e.g., confidence metric or risk score is below the respective threshold) may be saved and used to train the threat detector 420 (e.g., train a CNN or other machine learning model) to improve performance by reducing the number of false alarms that require validation. Alternatively or additionally, the data from a potential threat may be saved if the confidence score and/or risk score is below a threshold (e.g., a different threshold than used to determine if an action should be taken). In some embodiments, data may be saved and used to train other weights and/or parameters described herein. For example, the weighing between different inputs to the confidence calculator and/or the risk calculator.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A video monitoring system for detecting and validating security threats, the video monitoring system comprising:
  one or more memory devices having instructions stored thereon that, when executed by one or more processors, cause the one or more processors to perform operations comprising:
  detecting a possible threat by evaluating video data using one or more artificial intelligence models;
  determining, based on a type of the possible threat, an expected measurement for a building sensor associated with a location of the possible threat;
  calculating a threat confidence metric based on the expected measurement for the building sensor and an actual measurement for the building sensor;

calculating an environment risk factor based on the actual measurement for the building sensor and the evaluation of the video data;
  calculating a total risk based on a threat type, the threat confidence metric, and the environment risk factor; and
  initiating an action based at least in part on a magnitude of the threat confidence metric total risk.

2. The video monitoring system of claim 1, the operations further comprising sending a command to a building automation system to mitigate the possible threat dependent on the magnitude of the threat confidence metric.

3. The video monitoring system of claim 1, wherein the building sensor comprises at least one of:
  a microphone;
  a pressure sensor;
  a vibration sensor;
  an accelerometer;
  an occupancy sensor;
  a contact switch;
  a $CO_2$ sensor; or
  a light sensor.

4. The video monitoring system of claim 1, the operations further comprising calculating the total risk score based on the type of the possible threat, the threat confidence metric, and the location of the possible threat, wherein initiating the action is based at least in part on the magnitude of the total risk score.

5. The video monitoring system of claim 4, wherein calculating the total risk score is further based on environmental information determined by the one or more artificial intelligence models.

6. The video monitoring system of claim 1, wherein calculating the threat confidence metric comprises evaluating the one or more artificial intelligence models using the expected measurement for the building sensor and the actual measurement for the building sensor.

7. The video monitoring system of claim 1, wherein the video data is stored to train the one or more artificial intelligence models in response to the threat confidence metric being less than a threshold.

8. The video monitoring system of claim 1, wherein the expected measurement comprises a sum of a representative measurement for the building sensor and an expected change based on the type of the possible threat.

9. The video monitoring system of claim 8, the operations further comprising calculating the representative measurement for the building sensor based on:
  historical measurements of the building sensor from time periods satisfying a similarity criterion to a time of the possible threat; or
  measurements of the building sensor from a time period preceding the time of the possible threat.

10. A method for detecting and validating security threats, the method comprising:
  detecting a possible threat by evaluating video data using one or more artificial intelligence models;
  determining, based on a type of the possible threat, an expected measurement for a building sensor associated with a location of the possible threat;
  calculating a threat confidence metric based on the expected measurement for the building sensor and an actual measurement for the building sensor;
  calculating an environment risk factor based on the actual measurement for the building sensor and the evaluation of the video data;
  calculating a total risk based on a threat type, the threat confidence metric, and the environment risk factor; and initiating an action based at least in part on a magnitude of the threat confidence metric total risk.

11. The method of claim 10, further comprising sending a command to a building automation system to mitigate the possible threat based at least in part on the magnitude of the threat confidence metric.

12. The method of claim 10, wherein the building sensor comprises at least one of:
a microphone;
a pressure sensor;
a vibration sensor;
an accelerometer;
an occupancy sensor;
a contact switch;
a $CO_2$ sensor; or
a light sensor.

13. The method of claim 10, further comprising calculating the total risk score based on the type of the possible threat, the threat confidence metric, and the location of the possible threat, wherein generating the alert initiating the action is dependent on the magnitude of the total risk score.

14. The method of claim 13, wherein calculating the total risk score is further based on environmental information determined by the one or more artificial intelligence models.

15. The method of claim 10, wherein calculating the threat confidence metric comprises evaluating the one or more artificial intelligence models using on the expected measurement for the building sensor and the actual measurement for the building sensor.

16. The method of claim 10, wherein the video data is stored to train the one or more artificial intelligence models in response to the threat confidence metric being less than a threshold.

17. The method of claim 10, wherein the expected measurement comprises a sum of a representative measurement for the building sensor and an expected change based on the type of the possible threat.

18. The method of claim 17, further comprising calculating the representative measurement for the building sensor based on:
historical measurements of the building sensor from time periods satisfying a similarity criterion to a time of the possible threat; or
measurements of the building sensor from a time period preceding the time of the possible threat.

19. A video monitoring system for detecting and validating security threats, the video monitoring system comprising:
one or more memory devices having instructions stored thereon that, when executed by one or more processors, cause the one or more processors to perform operations comprising:
detecting a possible threat by evaluating video data using one or more artificial intelligence models;
calculating a threat confidence metric based on a measurement for a building sensor associated with a location of the possible threat and the evaluation of the video data;
calculating an environment risk factor based on the measurement for the building sensor and the evaluation of the video data;
calculating a total risk based on a threat type, the threat confidence metric, and the environment risk factor; and
initiating an action responsive to the total risk exceeding a threshold.

20. The video monitoring system of claim 19, wherein evaluating the video data comprises outputting a threat uncertainty and calculating the threat confidence metric uses the threat uncertainty.

* * * * *